UNITED STATES PATENT OFFICE.

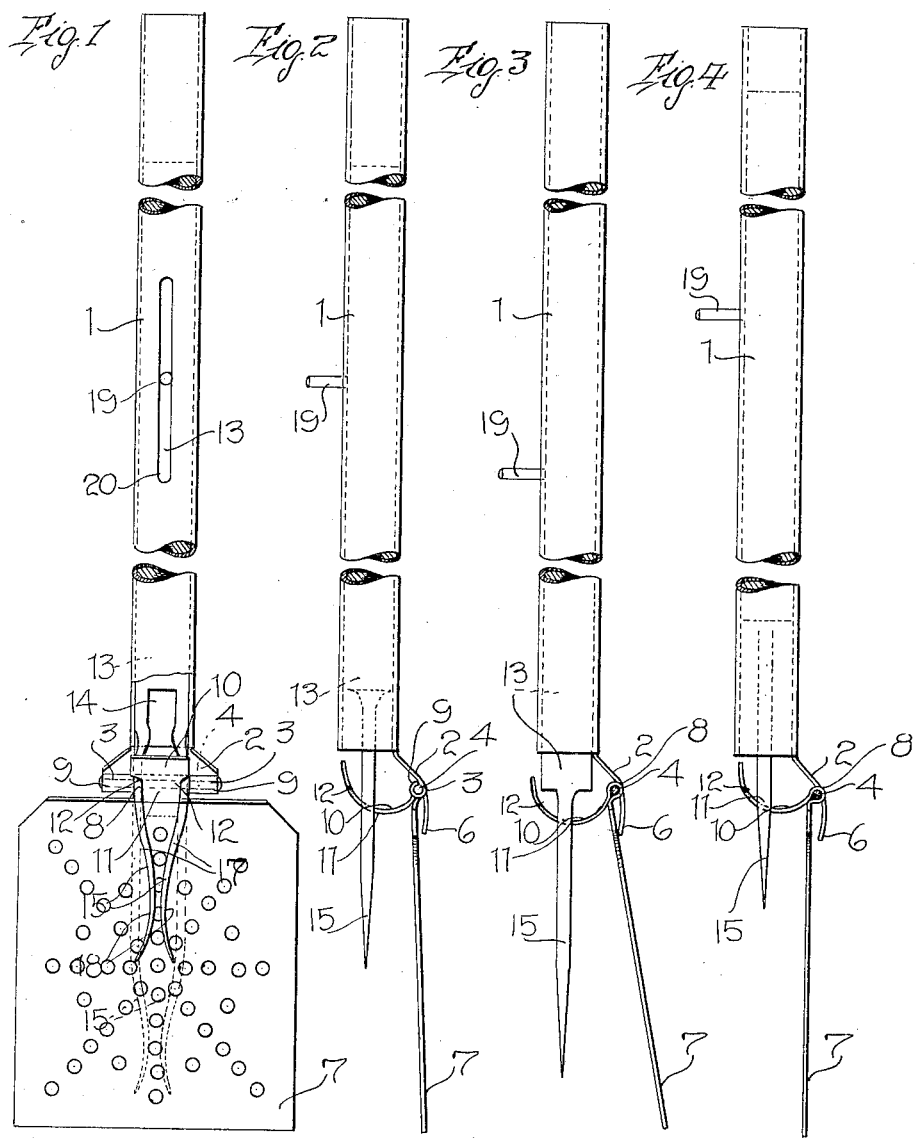

EUGENE L. EMORY, OF SUFFOLK, VIRGINIA, ASSIGNOR OF ONE-HALF TO HARRY E. BRUCE, OF SUFFOLK, VIRGINIA.

COMBINED PANCAKE-TURNER AND FORK.

1,089,118.

Specification of Letters Patent.

Patented Mar. 3, 1914.

Application filed June 19, 1913. Serial No. 774,630.

*To all whom it may concern:*

Be it known that I, EUGENE L. EMORY, a citizen of the United States, residing at Suffolk, in the county of Nansemond and State of Virginia, have invented certain new and useful Improvements in Combined Pancake-Turners and Forks, of which the following is a specification, reference being had to the accompanying drawings.

This invention relates to new and useful improvements in kitchen articles and more particularly to a pan cake turner and fork, the object of the invention being to provide a device of the above character which consists of a tubular handle member having a pivotally mounted turning plate at one end thereof and a reciprocating rod mounted in the handle, having a fork member at one end which is adapted to actuate the turning plate upon the reciprocation of the rod to arrange said plate at an angle with respect to the handle, so that the fork will be readily adapted for use.

Another object of the invention is the provision of a combined cake turner and fork which will possess advantages in points of efficiency and durability, is inexpensive of manufacture and at the same time is simple in construction and operation.

With the above and other objects in view, this invention consists in the novel features of construction and the combination and arrangement of parts to be hereinafter more fully described, pointed out in the claims and shown in the accompanying drawings, in which—

Figure 1 is a rear elevation of my improved kitchen article; Fig. 2 is a side elevation; Fig. 3 is a similar view illustrating the fork in its operative position and the turning plate in an inoperative position. Fig. 4 is a side elevation illustrating the turning plate in its operative position and the fork in its inoperative position; Fig. 5 is a detail perspective view of the end of the handle to which the turning plate is pivoted; and Fig. 6 is a detail perspective view of the tongue formed at one end of the turning plate.

Referring more particularly to the drawings, 1 indicates the tubular handle member, one end of which is provided with an extension 2, the outer end of which is provided with the spaced bearings 3 for the pivot pin 4. The central portion of the extension 2 is cut away, as shown at 5, and arranged upon opposite sides of the cut away portion are the two forwardly curved fingers 6, the purpose of which will be fully described hereinafter. A perforated turning plate 7 is provided upon one end of which is formed a tongue 10, said tongue being bent upon itself adjacent the end of the plate to form a bearing 8, which is mounted upon the pivot pin 4 and disposed between the two end portions 9 of the bearing 3. The tongue 10, after forming the bearing 8 is curved outwardly and rearwardly, as shown at 11, and formed at the outwardly curved portion are the oppositely disposed recesses 12.

Mounted for reciprocatory movement within the handle member 1 is a rod 13, the outer end of which is bifurcated, as shown at 14, to form the spaced tines 15, which comprise the fork. The outer ends of the tines 15 are convergently curved, as shown at 17, and the extreme ends thereof are divergently curved, as shown at 18. The tines 15 are arranged within the recesses 12 of the tongue 10 and upon the reciprocation of the rod, the tongue is actuated so that the turning plate 7 will be disposed at an angle with respect to the rod, as clearly shown in Fig. 3, so that the fork will be readily placed in position for use, the turning plate being thrown upwardly out of the way by the reciprocation of the rod 13. The rod 13 is provided upon one side thereof with an outwardly projecting lug 19 which is arranged within an elongated slot 20 formed in one side of the handle 1 whereby the rod 13 may be quickly and readily reciprocated by grasping the lug 19 and moving the same within the slot 20.

From the above it will be readily apparent that the turning plate 7 is normally disposed in alinement with the handle member 1 so that the same may be quickly and readily used for turning pan cakes, eggs, when being fried, and for various other purposes. It will also be apparent that by grasping the lug 19 and reciprocating the rod 13, the outward movement of the fork will actuate the turning plate 7 through the medium of the tongue which is formed integral therewith and arrange the plate at an angle with respect to the handle so as to be entirely out of the way when it is desired to use the fork member. When the fork member is returned to its normal position, as shown in Fig. 4, the turning plate will also be returned by having the converging portions 17 engaged with the tongue thereof. It will be readily apparent that by having the curved finger members 6 formed at the outer end of the handle 1, the outward swinging movement of the turning plate, when disposed at an angle with respect to the handle will be limited.

It will be readily understood from the foregoing description taken in connection with the accompanying drawings, that I have provided a simple and durable device which can not only be used for turning pan cakes, eggs and for various other purposes, but may be readily used in the capacity of a fork or similar article. It will also be apparent that my device is extremely simple in construction and can be manufactured at a comparatively low cost.

While I have shown and described the preferred form of my invention, it will be obvious that various changes in the details of construction and in the proportions may be resorted to for successfully carrying my invention into practice without sacrificing any of the novel features or departing from the scope of the appended claims.

What I claim is:—

1. A device of the class described including a tubular handle, a turning plate pivotally mounted upon one end thereof and normally disposed in an offset position with respect to the handle, a rod movable in said handle, and means carried by said plate and the rod adapted for engagement, whereby upon reciprocation of the rod the plate will be actuated to dispose the same at an angle with respect to the rod or return said plate to its normal position.

2. A device of the class described including a tubular handle, a turning plate pivotally mounted upon one end thereof, a reciprocating rod within the handle, a tongue formed integral with the turning plate, and means carried by the rod for engaging said tongue whereby upon reciprocation of the rod the plate will be actuated to dispose the same at an angle with respect to the handle.

3. A device of the class described including a tubular member, a turning plate pivotally mounted upon one end thereof and normally disposed in an offset position with respect to the handle, a reciprocating rod mounted within the handle member, a tongue formed integral with the turning plate and provided with oppositely disposed recesses, and forked projections formed at the outer ends of said rod and arranged within said recesses whereby the turning plate will be actuated and disposed at an angle with respect to the handle upon reciprocation of the rod.

4. A device of the class described including a tubular handle having an extension formed at one end, spaced bearings formed at the outer end of said extension, a turning plate having a tongue formed integral therewith, a bearing formed in the medial portion of said tongue, a pivot pin mounted within the aforesaid bearings to pivotally connect the turning plate to the handle, a reciprocating rod mounted within the handle, forked projections formed at the outer end of said rod and adapted to engage the end of said tongue whereby upon reciprocation of said rod the turning plate will be disposed at an angle with respect to the handle.

5. A device of the class described including a tubular handle member, spaced bearings formed at one end thereof, a turning plate having a tongue formed at one end, said tongue being bent upon itself adjacent its inner end to form a bearing adapted to be arranged between said spaced bearings on the handle, a pivot pin arranged within said bearings, a movable rod within said handle, means at the outer end of said rod adapted for engagement with the tongue whereby upon reciprocation of the rod the turning plate will be disposed at an angle with respect to the handle, and curved fingers formed at the outer end of said handle adapted to be engaged by the turning plate to limit swinging movement of the same.

In testimony whereof I hereunto affix my signature in the presence of two witnesses.

EUGENE L. EMORY.

Witnesses:
HARRY E. BRUCE,
FREDERICK S. STITT.

---

Copies of this patent may be obtained for five cents each, by addressing the "Commissioner of Patents, Washington, D. C."